US007724769B2

(12) United States Patent
Morioka

(10) Patent No.: US 7,724,769 B2
(45) Date of Patent: May 25, 2010

(54) DATA TRANSMISSION SYSTEM, DATA TRANSMISSION METHOD, AND MEDIA APPARATUS

(75) Inventor: Yasuhiro Morioka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 888 days.

(21) Appl. No.: 11/213,729

(22) Filed: Aug. 30, 2005

(65) Prior Publication Data
US 2006/0056449 A1    Mar. 16, 2006

(30) Foreign Application Priority Data
Sep. 15, 2004   (JP)   ............... 2004-268291
Aug. 8, 2005   (JP)   ............... 2005-229897

(51) Int. Cl.
*H04J 3/16*    (2006.01)
(52) U.S. Cl. ................................. 370/466
(58) Field of Classification Search ........... 370/466; 345/302; 715/201, 210; 709/231
See application file for complete search history.

(56) References Cited

U.S. PATENT DOCUMENTS

| 6,961,318 | B2 * | 11/2005 | Fichou et al. | 370/254 |
|---|---|---|---|---|
| 2004/0221044 | A1 * | 11/2004 | Rosenbloom et al. | 709/227 |
| 2005/0021590 | A1 * | 1/2005 | Debique et al. | 709/200 |
| 2005/0188193 | A1 * | 8/2005 | Kuehnel et al. | 713/155 |
| 2006/0026293 | A1 * | 2/2006 | Virdi et al. | 709/231 |

FOREIGN PATENT DOCUMENTS

JP    2002-304333    10/2002

WO    2004/039005 A1    5/2004

OTHER PUBLICATIONS

"Remote UIClient:1 Service Template Version 1.01", 2004 Contributing Members of the UPnP Forum, Sep. 2, 2004, pp. 29.*
"Designing a UPnP* AV MediaServer", Intel Corporation, Version 1.00, Jul. 31, 2003, pp. 48.
"Designing a UPnP* AV MediaRenderer", Intel Corporation, Version 1.00, May 20, 2003, pp. 46.
"UPnP AV Architecture: 0.83", 2000 Contributing Members of the UPnP Forum, Jun. 12, 2002, pp. 22.
"ConnectionManager:1 Service Template Version 1.01", Contributing Members of the UPnP Forum, Jun. 25, 2002, pp. 25.

* cited by examiner

*Primary Examiner*—Ricky Ngo
*Assistant Examiner*—Chandrahas Patel
(74) *Attorney, Agent, or Firm*—Oblon, Spivak, McClelland, Maier & Neustadt, L.L.P.

(57) ABSTRACT

According to an aspect of the present invention, there is provided with a data transmission method that uses first and second media devices which communicate with each other according to a predetermined transmission protocol and a control device which controls the first and second media devices based on a UPnP AV protocol, including: establishing a virtual connection between the first and second media devices under control of the control device; transmitting a real connection establishment request from the first media device to the second media device, the real connection establishment request including information of the virtual connection; establishing a real connection between the first and second media devices, the established real connection being related to the virtual connection; and transmitting media data from the second media device to the first media device or versa by using the established real connection.

8 Claims, 14 Drawing Sheets

| | PeerManager | uuid:E6CAB760-6863-43e8-8184-CC22FB4CB62C |
|---|---|---|
| VIRTUAL CONNECTION INFORMATION | PeerServiceId | urn:upnp-org:serviceId:ConnectionManager |
| | PeerConnectionID | -1 |
| | ConnectionID | 25 |
| REAL CONNECTION INFORMATION | handle | 0x0000(NULL) |
| | status | INACTIVE |
| | Last closed time | 17:35:48:223355 |

FIG. 5

| | | |
|---|---|---|
| VIRTUAL CONNECTION INFORMATION | PeerManager | uuid:E6CAB760-6863-43e8-8184-CC22FB4CB62C |
| | PeerServiceId | urn:upnp-org:serviceId:ConnectionManager |
| | PeerConnectionID | -1 |
| | ConnectionID | 25 |
| REAL CONNECTION INFORMATION | handle | 0x2345 |
| | status | ACTIVE |
| | Last closed time | 17:35:48:223355 |

FIG. 14

DATA TRANSMISSION SYSTEM, DATA TRANSMISSION METHOD, AND MEDIA APPARATUS

CROSS-REFERENCE TO RELATED APPLICATIONS

This application claims the benefit of priority under 35USC §119 to Japanese Patent Application No. 2004-268291, filed on Sep. 15, 2004 and No. 2005-229897, filed on Aug. 8, 2005, the entire contents of which are incorporated herein by reference.

BACKGROUND OF THE INVENTION

1. Field of the Invention

The present invention relates to a data transmission system, a data transmission method, and a media apparatus.

2. Related Art

Audio devices and video devices (to be referred to AV devices hereinafter) are coupled to each other through a network and exchange video data or audio data with each other. In order to couple the AV devices to perform data transfer between the AV devices, some protocol is necessary. For example, a protocol such as IEEE (The Institute of Electrical and Electronics Engineers) 1394 scheme using a serial bus, HTTP (Hyper Text Transport Protocol), or RTSP (Realtime Streaming Protocol) is known. HTTP and RTSP are defined on TCP/IP protocol on an IEEE802 network.

Protocols used in the AV devices are various. Therefore, devices using various protocols can be arranged on the same network. Therefore, a procedure that controls transmission of data between the AV devices on the network is required to be compatible with the various protocols. One that realizes the procedure is a Universal Plug and Play (UPnP) protocol. In particular, a UPnP AV protocol is developed to associate the AV devices with each other.

In the UPnP AV protocol, AV data transmission between the AV devices is performed by using the concept of a virtual connection. Although the virtual connection is associated with actual transmission path or input/output plugs of the devices, the virtual connection is treated in the UPnP AV protocol in a way that the virtual connection does not depend on actual transmission path or transmission protocols. AV data transmission and control performed by the UPnP AV are managed by using the virtual connection.

However, a conventional virtual connection used in the UPnP AV is not always related to actual AV data transmission. For this reason, it is frequent that the management and the control of the AV data transmission cannot be effectively performed.

For example, in an IEEE1394 protocol, communication is performed by establishing a continuous connection between an input plug of an AV device and an output plug of another AV device. In this case, the real connection and a virtual connection can be easily related to each other. This is because a real connection is established in advance, and a virtual connection can be related to the real connection. More specifically, it can be understood that both the ends of the virtual connection are related to the input plug of an actual AV device and the output plug of another actual AV device, and it can be understood that data transmission is performed in a period in which a real connection continues so that the virtual connection also continues.

On the other hand, in an HTTP protocol, when a virtual connection is established, any real connection is not established. When a SetAVTransportURI( ) action of an AV Transport service of UPnP AV is performed after establishment of a virtual connection, a Play action is then performed, and a transmission request is then issued from a reproduction side or a transmission side of AV data transmission, the real connection is established. In establishment of a real connection, the virtual connection and the real connection can be related to each other on the basis of a virtual connection ID and a URI which are arguments of the SetAVTransportURI action in a media renderer or a media server, on the basis of control performed by a control point.

This problem has been pointed out. For example, in Chapters 5.4 to 5.6 of a reference "Designing a UPnP AV Media Renderer v1.0 Intel Corporation, 2003", it is described that a virtual connection and a real connection must be related to each other. However, any concrete method is not described in the reference. In addition, in section 5.14.1 of a reference "Designing a UPnP AV Media Server v1.0 Intel Corporation, 2003", it is described that when HTTP_GET is used in delivery of content, a virtual connection and a real connection cannot be related to each other. Japanese Patent Application Laid-open No. 2002-304333 "TRANSMISSION METHOD AND TRANSMISSION APPARATUS" explains procedures of content search, content transmission, and content reproduction which are employed in the UPnP AV. This reference does not refer to any relating between a virtual connection and a real connection.

SUMMARY OF THE INVENTION

According to an aspect of the present invention, there is provided a data transmission system including first and second media devices that communicate with each other according to a predetermined transmission protocol and a control device that controls the first and second media devices according to a UPnP AV protocol different from the predetermined transmission protocol. The control device includes a virtual connection establisher and a communication controller. The virtual connection establisher establishes a virtual connection in accordance with the UPnP AV protocol between the first and second media devices. The communication controller transmits instruction data to the first media device for instructing the first media device to receive media data from the second media device or transmit media data to the second media device by using the virtual connection. The first media device includes a real connection establishment requester and a first communicator. The real connection establishment requester generates a real connection establishment request for requesting the second media device to establish a real connection for receiving or transmitting the media data in accordance with the predetermined transmission protocol in a case of receiving the instruction data, and which transmits the real connection establishment request to the second media device in accordance with the predetermined transmission protocol, the real connection establishment request including information of the virtual connection. The first communicator receives the media data from the second media device or transmits the media data to the second media device by using the established real connection. The second media device includes a real connection establisher and a second communicator. The real connection establisher establishes the real connection with the first media device on a basis of the real connection establishment request from the first media device in accordance with the predetermined transmission protocol, the established real connection being related to the virtual connection. The second communicator transmits the media data to the first media device or receives the media data from the first media device by using the established real connection.

According to an aspect of the present invention, there is provided a data transmission method that uses first and second media devices which communicate with each other according to a predetermined transmission protocol and a control device which controls the first and second media devices based on a UPnP AV protocol different from the predetermined transmission protocol. A virtual connection is established between the first and second media devices under control of the control device. A real connection establishment request is generated based on the predetermined transmission protocol in the first media device, the real connection establishment request including information of the virtual connection. The real connection establishment request is transmitted from the first media device to the second media device. A real connection is established between the first and second media devices, the established real connection being related to the virtual connection. Media data is transmitted from the second media device to the first media device or versa by using the established real connection.

According to an aspect of the present invention, there is provided a media device which communicates with a further media device according to a predetermined transmission protocol and which is controlled by a control device in accordance with a UPnP AV protocol different from the predetermined transmission protocol. The media device includes a virtual connection establisher, a request generator, a request transmitter and a data communicator. A virtual connection establisher establishes a virtual connection with the further media device in a case of receiving instruct of instructing to establish the virtual connection from the control device. The request generator, in a case of being instructed to receive media data from the further media device or transmit media data to the further media device by using the virtual connection from the control device, generates a request for requesting the further media device to establish a real connection for receiving or transmitting the media data in accordance with on the predetermined transmission protocol, the request including information of the established virtual connection. The request transmitter transmits the generated request including the information of the established virtual connection to the further media device to establish the real connection with the further media device in accordance with the predetermined transmission protocol. The data communicator receives the media data from the further media device or transmits the media data to the further media device by using the established real connection.

According to an aspect of the present invention, there is provided a media device which communicates with a further media device according to a predetermined transmission protocol and which is controlled by a control device in accordance with a UPnP AV protocol different from the predetermined transmission protocol. The media device includes a virtual connection establisher, a request receiver, a real connection establisher and a data communicator. The virtual connection establisher establishes a virtual connection with the further media device in accordance with the UPnP AV protocol in a case of receiving an instruction to establish the virtual connection from the control device, and which transmits information of the established virtual connection to the control device. The request receiver receives an establishment request of a real connection for transmitting media data to the further media device or receiving media data from the further media device, from the further media device. The real connection establisher, in a case where the information of the established virtual connection is included in the establishment request, establishes the real connection related to the virtual connection in accordance with the predetermined transmission protocol. The data communicator transmits the media data to the further media device or receives the media data from the further media device, by using the real connection.

BRIEF DESCRIPTION OF THE DRAWINGS

FIG. 5 is a diagram showing a concrete example of virtual connection information;

FIG. 14 is a diagram showing concrete examples of virtual connection information and real connection information.

DETAILED DESCRIPTION OF THE INVENTION

Figure 1:
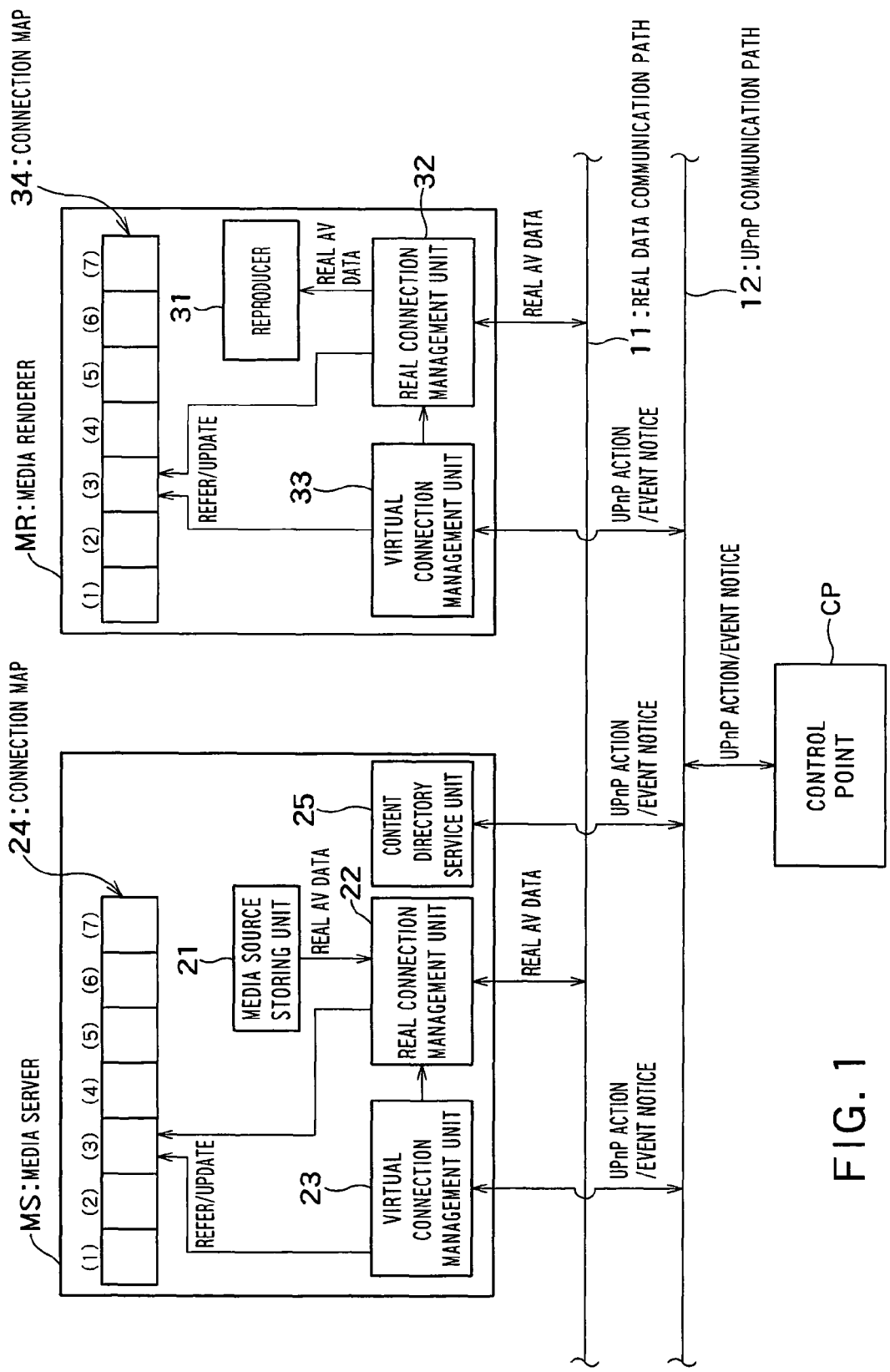
FIG. 1 is a block diagram showing an illustrative example of a transmission system according to the present invention.

FIG. 1 is a block diagram showing an illustrative example of a transmission system according to the present invention. A media server MS, a media renderer MR, and a control point CP are connected to each other through a network such as a home network. The media server MS, the media renderer MR, and the control point CP can execute procedure according to a UPnP AV protocol. The UPnP AV protocol and specifications related to the UPnP AV protocol are closely described in, e.g., "http://www.upnp.org/standardizeddcps/mediaserver.asp" "UPnP AV Architecture v0.83, Jun. 12, 2002" "Connection Manager V1.0, Jun. 25, 2002" "Designing a UPnP AV Media Renderer v1.0, Intel Corporation, 2003 (http://www.intel.com/technology/upnp/download/Designing_a_UPnP_AV_MediaRenderer_v1_0-XF.pdf)" "Designing a UPnP AV Media Server v1.0, Intel Corporation, 2003 (http://www.intel.com/technology/upnp/download/Designing_a_UPnP_AV_MediaServer.pdf)".

In FIG. 1, the media server MS is, for example, a DVD player, a CD player, a satellite broadcasting receiver, a cable television receiver, or the like. A media source storing unit 21 in the media server MS stores content data to be reproduced by the media renderer MR.

The media renderer MR is, for example, a television, a stereo set, a loudspeaker, a mobile audio player, or the like. A reproducer 31 in the media renderer MR reproduces content data acquired from the media server MS through a network.

The control point CP controls the media server MS and the media renderer MR. The control point CP can be operated by a user through, for example, an input interface (not shown).

A real connection management unit 22 in the media server MS performs data communication with a real connection management unit 32 in the media renderer MR through a real data communication path 11. More specifically, the real connection management unit 22 forms a real connection with the real connection management unit 32 in the real data communication path 11 to transmit AV data. The real connection management units 22 and 32 manage the status of the real connection as real connection information.

A virtual connection management unit 23 in the media server MS and a virtual connection management unit 33 in the media renderer MR performs operations of an AV Transport service (AVTS) and a Connection Manager service (CMS) of the UPnP AV protocol. The virtual connection management units 23 and 33 perform various processing with the control point CP through a UPnP communication path 12 according to UPnP. The UPnP communication path 12 and the real data communication path 11 may be included in, e.g., the same transmission medium (for example, a cable), or may be included in different transmission medium. The virtual connection management units 23 and 33 generate virtual connection information according to instructions by the control point CP (execution instruction of PrepareForConnection( ) action in the Connection Manager service). In this manner, the control point CP forms a virtual connection on the UPnP communication path 12 between the virtual connection management units 23 and 33. The virtual connection management units 23 and 33 manage the respective generated virtual connection information. A plurality of virtual connections can be formed between the virtual connection management units 23 and 33. In this case, each of the virtual connection management units 23 and 33 generates and manages plural pieces of virtual connection information.

A Content Directory service unit (CDS) 25 in the media server MS transmits information such as identifiers (URI) of various content data which can be supplied to the media renderer MR, a transmission protocol which is compatible with the content data, and a data format which is compatible with the content data, depending on a request from the control point CP.

A connection map 24 in the media server MS and a connection map 34 in the media renderer MR manage units of resources for forming real connections, as channels. In this embodiment, the connection map 24 has seven channels 24(1) to 24(7), and the connection map 34 also has seven channels 34(1) to 34(7). Each channel includes a pair of virtual connection information and real connection information registered in the channel.

Figure 2:
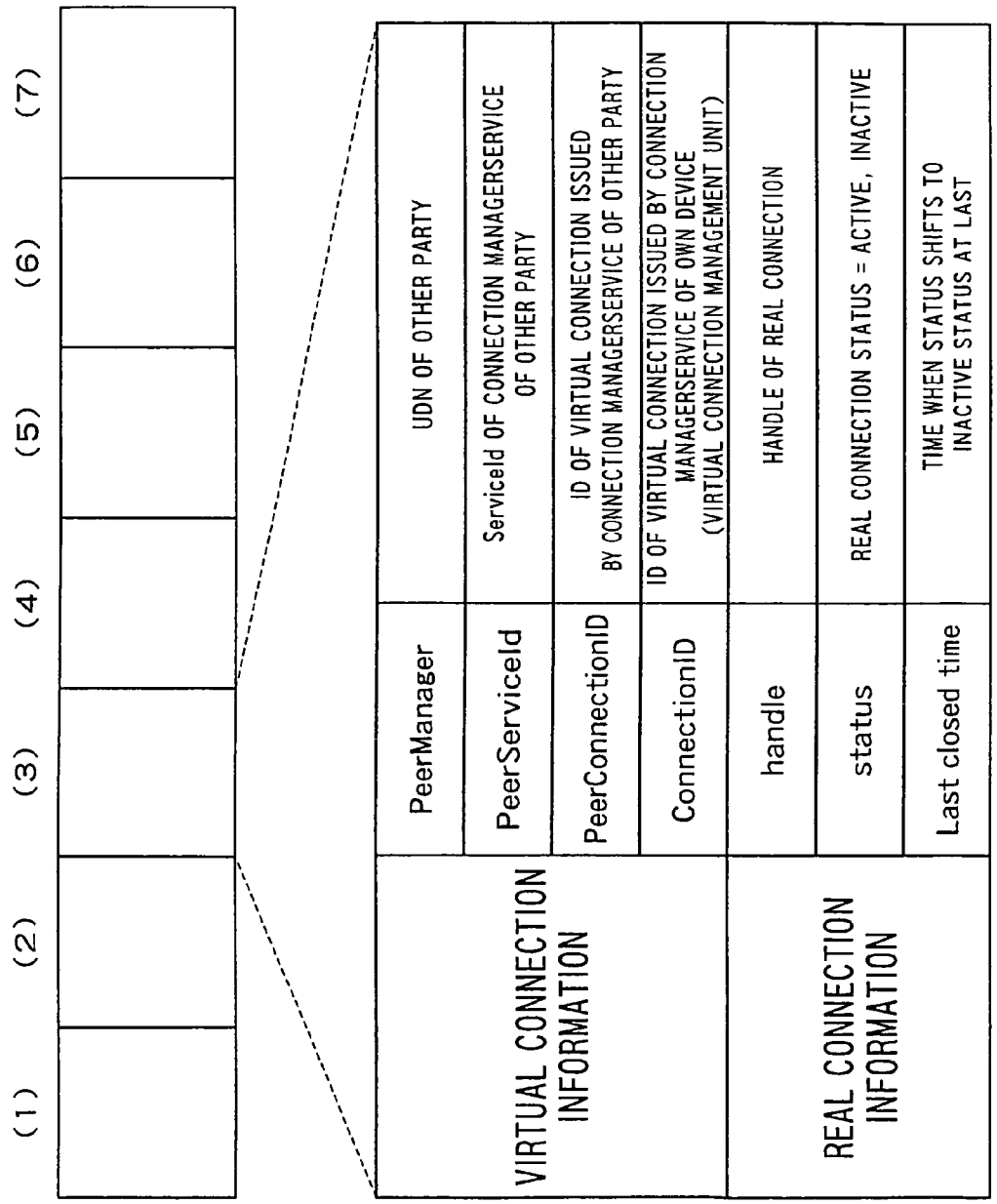
FIG. 2 is a diagram showing basic formats of virtual connection information and real connection information.

FIG. 2 shows basic formats of the virtual connection information and the real connection information.

The virtual connection information is a set of the following four pieces of information shown in Connection Manager specifications.

Peer Manager: Identifier of other party device (UDN: Unique Device Name)

Peer Service Id: service ID (service Id) of Connection Manager service of other party device Peer Connection ID: Virtual connection ID issued by Connection Manager service of other party device Connection ID: Virtual connection ID issued by Connection Manager service of own device Here, the own device is the media server MS or the media renderer MR, and the other party device is the media renderer MR for the media server MS or the media server MS for the media renderer MR.

In the following description, the UDN of the media server MS is given by "uuid:E6CAB760-6863-43e8-8184-CC22FB4CB62C" and the UDN of the media renderer MR is given by "uuid:B7DA4840-C028-4259-A56D-59551C79BF30". The service Id of the Connection Manager service in each of the media server MS and the media renderer MR is given by the same "urn: upnp-org: serviceId:ConnectionManager".

On the other hand, the real connection information is a set of the following three pieces of information.

handle: Identifier of real connection status: flag representing status (active or inactive) of real connection Last closed time: time (last inactivity shift time) at which real connection becomes inactive (for example, connection obtained by transfer protocol is disconnected, data do not flow for predetermined period of time, or the like) at last In each channel, when both virtual connection information and real connection information are not registered, it means that the channel is not used in both the virtual connection management unit and the real connection management unit. For example, this corresponds to a case in which both a virtual connection and a real connection are not established.

On the other hand, when both the virtual connection information and the real connection information are registered, it means that the channel is used in both the virtual connection management unit and the real connection management unit. This corresponds to a case in which both the virtual connection and the real connection are established.

When only the virtual connection information is registered, it means that although the channel is used by the virtual connection management unit, the channel is not used by the real connection management unit. For example, this corresponds to a case in which although the virtual channel is established, the real channel is not established.

Furthermore, when only the real connection information is registered, it means that although the channel is used by the real connection management unit, the channel is not used by the virtual connection management unit. For example, this corresponds to a case in which although a virtual connection is not established by the virtual connection management unit, a real connection is established. More specifically, this corresponds to a case in which a transmission path to other party device is established without a Connection Manager service of UPnP AV.

Figure 3:
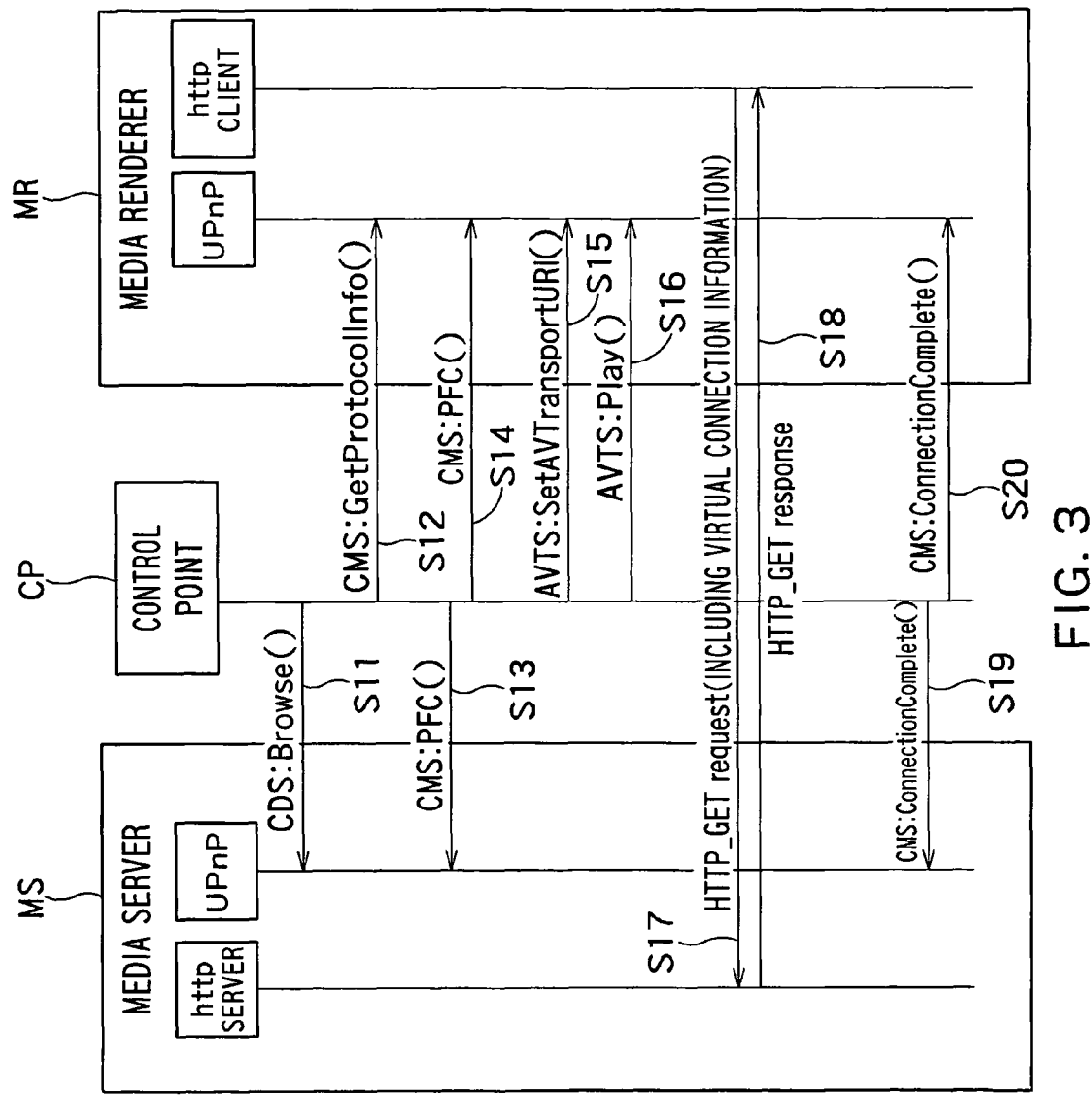
FIG. 3 is a sequence diagram showing a basic operation performed by the transmission system in FIG. 1.

FIG. 3 is a sequence diagram showing a basic operation by the transmission system in FIG. 1.

An http server in the media server MS includes, for example, the real connection management unit 22 shown in FIG. 1, and a UPnP unit includes the virtual connection management unit 23. An http client in the media renderer MR includes, for example, the reproducer 31 and the real connection management unit 32 shown in FIG. 1, and a UPnP unit includes the virtual connection management unit 33.

The control point CP orders the Content Directory service unit 25 in the media server MS to perform Browser( ) action (step S11). The Content Directory service unit 25 ordered to perform the Browse( ) action gives information such as an identifier (URI) of the content data held in the media source storing unit 21, a transmission protocol which is compatible with the content data, and a data format which is compatible with the content data, to the control point CP.

The control point CP orders the Control Manager service of the virtual connection management unit 33 in the media renderer MR to perform a GetProtocolInfo( ) action (step S12). The virtual connection management unit 33 ordered to perform the GetProtocolInfo( ) action gives the information such as the compatible transmission protocol and the compatible data format to the control point CP.

Figure 4:
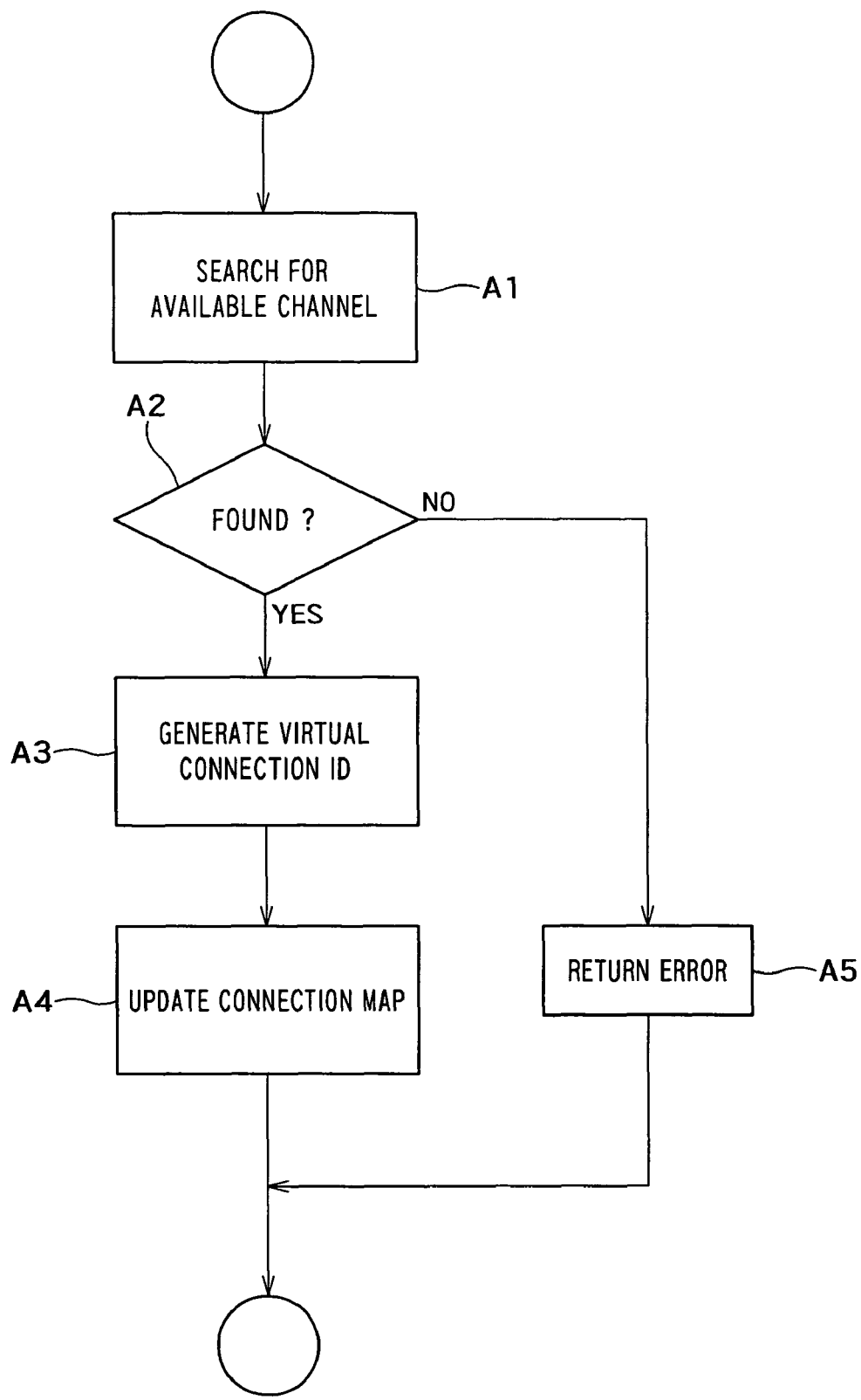
FIG. 4 is a flow chart showing a flow of a virtual connection information generating process.

The control point CP orders the Connection Manager service of the virtual connection management unit 23 in the media server MS to perform a Prepare For connection( ) action (PFC( ) action) (step S13). At this time, as an argument, a UDN of the media renderer MR, a service Id of a Connection Manager service, and a virtual connection ID (PeerConnectionID) allocated in the media renderer MR are given. The UDN and the service Id are notified from the media renderer MR to the control point CP in advance by multicast delivery according to a UPnP protocol. On the other hand, with respect to the Peer Connection ID, since virtual connection information is not registered in the media renderer MR at this time, as a virtual connection ID of the media renderer MR which is one of arguments used when the control point CP calls a PFC( ) action of the Connection Manager service of the media server MS, "−1" or "0" is given from the control point CR The virtual connection management unit 23 in the media server MS ordered by the control point CP to perform the PFC( ) action executes a virtual connection information generating process shown in the flow chart in FIG. 4.

The connection map 24 is searched for an available (blank) channel (step A1). The available (blank) channel is a channel in which both the virtual connection information and the real connection information is not registered.

When an available channel is present (YES in step A2), one channel is acquired, and a virtual connection ID is generated (step A3).

The generated virtual connection ID is registered in the channel, and the UDN and the service Id given as the arguments of the PFC( ) action are also registered in the channel. In this manner, the connection map 24 is updated (step A4). In this case, it is assumed that "25" is allocated as a virtual connection ID (ConnectionID) for the acquired channel, that "uuid:E6CAB760-6863-43e8-8184-CC22FB4CB62C" is registered as UDN (PeerManager), and "urn:upnp-org:serviceId:ConnectionManager" is registered as the service Id (PeerServiceId). Since virtual connection information is not registered in the media renderer MR at this time, it is assumed that, as the virtual connection ID (PeerConnectionID) of the media renderer MR, the above "−1" is registered. FIG. 5 shows contents registered as the virtual connection information. As is apparent from FIG. 5, real connection information is not yet registered (handle is null). The media server MS returns the registered virtual connection information to the control point CP.

Figure 6:
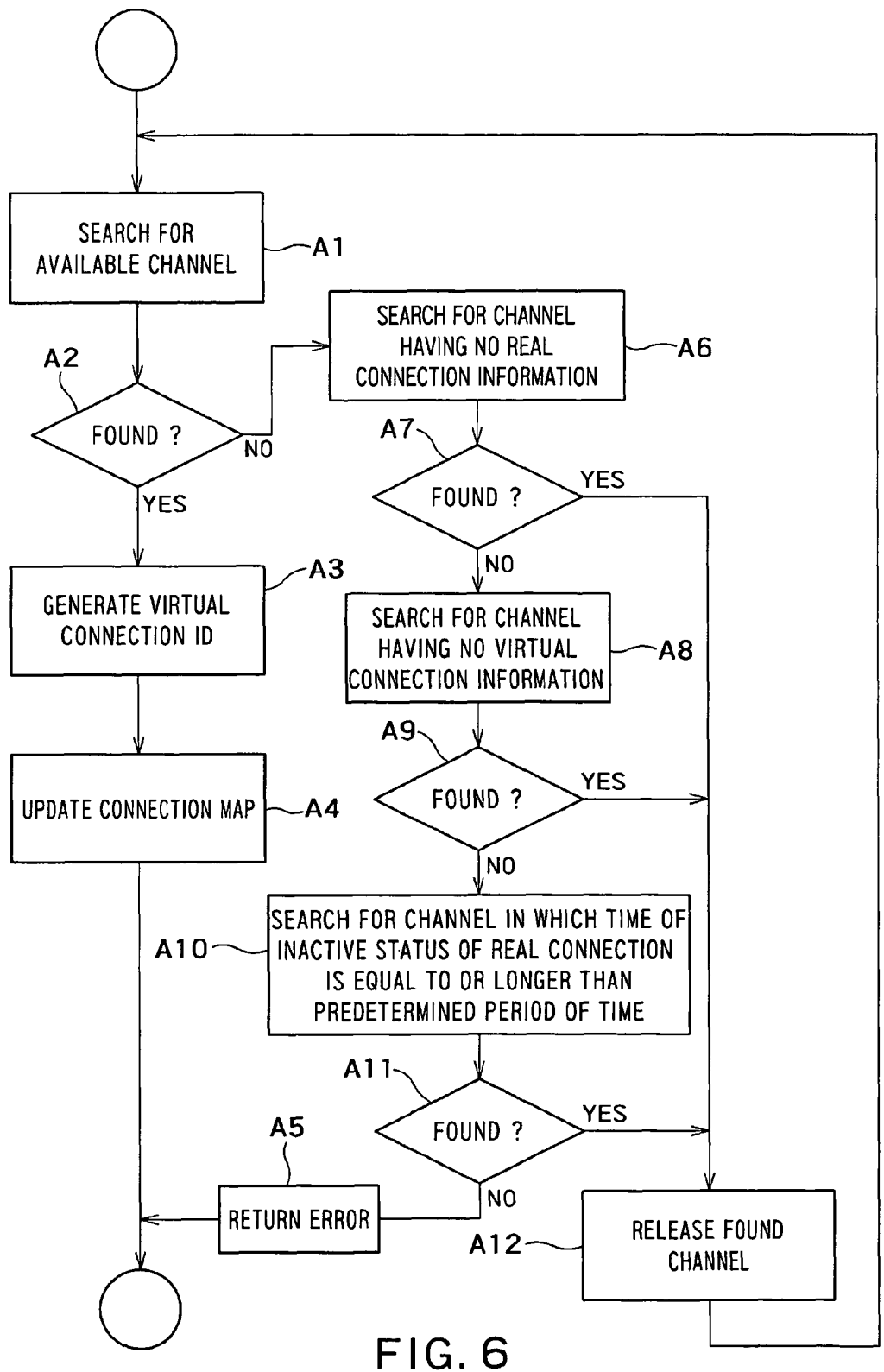
FIG. 6 is a flow chart showing a flow of another example of the virtual connection information generating process.

When an available channel is absent in step A2 (NO in step A2), as an execution result of the PFC( ) action, an error is returned to the control point CP (step A5). In place of returning the error, the channel in use may be released, and the virtual connection information is registered in the released channel. Process steps performed in this case are shown in the flow chart in FIG. 6.

More specifically, when an available channel is absent (NO in step A2), a channel in which real connection information is not registered is searched for (step A6). When the channel is present (YES in step A7), the found channel is released (step A12), and the flow returns to step A1.

When the channel in which real connection information is not registered cannot be found (NO in step A7), i.e., when the real connection information are registered in all the channels, from among these channel, a channel in which virtual connection information is not registered is searched for (step A8). When the channel is found (YES in step A9), the found channel is released (step A12), and the flow returns to step A1.

When the channel in which virtual connection information is not registered cannot be found (NO in step A9), i.e., when both the virtual connection information and the real connection information are registered in all the channels, a channel on which inactive time of the real connection is a predetermined period of time or longer is searched for (step A10). When such channel is found (YES in step A11), the found channel is released (step A12), and the flow returns to step A1. When such channel is not found (NO in step A11), an error is returned (step A5).

Returning to FIG. 3, the control point CP similarly orders a Connection Manager service of the virtual connection management unit 33 in the media renderer MR to perform a PrepareForconnection( ) action (PFC( ) action) (step S14). This action utilizes, as arguments, a UDN of the media server MS, a serviceID of the Connection Manager service, and a virtual connection ID included in the virtual connection information received from the media server MS in step S13 and allocated by the Connection Manager service of the media server MS. The media server MS notifies the control point CP of the UDN and serviceID of the media server MS by multicast delivery according to UPnP in advance. The virtual connection management unit 33 in the media renderer MR ordered by the control point CP to perform the PFC( ) action executes processes shown in the flow chart in FIG. 4 or 6 as described above. When virtual channel information could be registered in a channel on the connection map 34, the media renderer MR returns the virtual channel information to the control point CP.

As an example, in the Connection Manager service of the media renderer MR, it is assumed that ConnectionID="3" is allocated. Therefore, virtual connection information on the media renderer MR side is given by:

PeerManager="uuid:E6CAB760-6863-43e8-8184-CC22FB4CB62C"

PeerServiceID="urn:upnp-org:serviceId:ConnectionManager"

PeerConnectionID="25"

ConnectionID="3".

In this manner, a virtual connection between the virtual connection management unit 23 in the media server MS and the virtual connection management unit 33 in the media renderer MR is established.

The control point CP orders the media renderer MR to perform a SetAVTransport URI( ) action of an AV Transport service (step S15). At this time, as an argument, the control point CP gives virtual connection information acquired from the media renderer MR in advance. The media renderer MR acquires, as an execution result of the SetAVTransportURI( ) action, a URI of content data designated by a user for the control point CP from the control point CP.

The control point CP orders the media renderer MR to perform a Play( ) action of the AV Transport service (step S16). At this time, as an argument, the control point CP also gives the virtual connection information acquired from the media renderer MR in advance. The media renderer MR acquires, as an execution result of the Play( ) action, content data having the URI given by the control point CP in step S15 from the media server MS to reproduce the content data.

More specifically, the real connection management unit 32 in the media renderer MR establishes a real connection to the real connection management unit 22 in the media server MS (steps S17 and S18).

Figure 7:
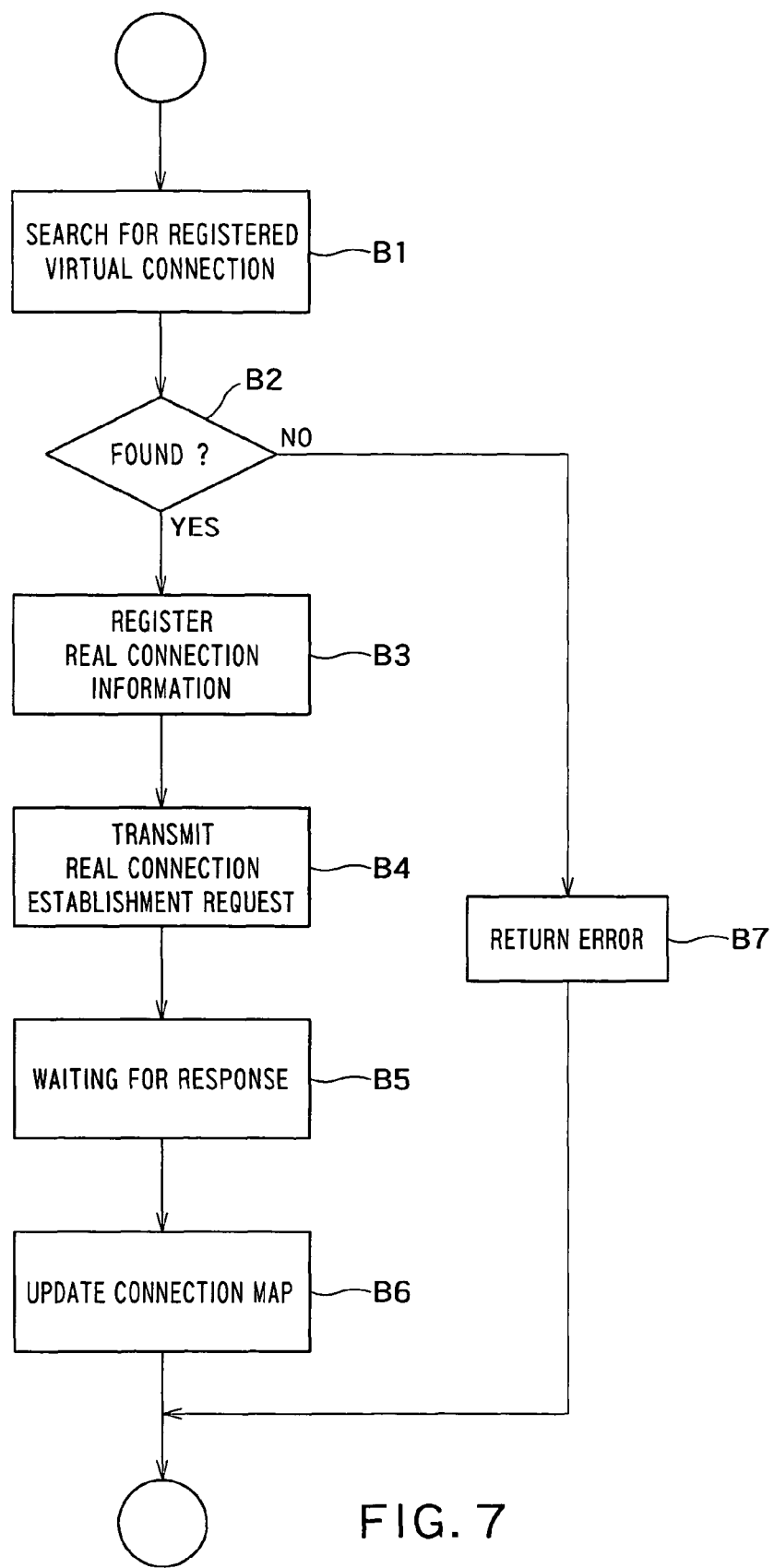
FIG. 7 is a flow chart showing a flow of a real connection establishing process on a media renderer MR side.

FIG. 7 is a flow chart showing a flow of a real connection establishing process (step S17) on the media renderer MR side.

The real connection management unit 32 in the media renderer MR searches the connection map 34 for a channel in which the virtual connection information received from the control point CP when the real connection management unit 32 is ordered to perform the SetAVTransportURI( ) action or the Play( ) action is registered (step B1).

When the channel is found (YES in step B2), real connection information is registered in the channel (step B3). More specifically, a value which identifies a real connection is set in a handle field (see FIG. 2), a status field is made inactive, and an appropriate initial value is set in a Last closed time field.

The real connection management unit 32 transmits an establishment request of the real connection including the virtual connection information to the real connection management unit 22 in the media server MS (step B4). More specifically, the establishment request of the real connection is transmitted by a GET request of HTTP. In this request, for example, the following pieces of information are added to a user-defined field of a request header field of the GET request.
GET/foo/bar.mpgHTTP/1.0
X-AV-ConnectionInfo:PeerUDN=uuid:E6CAB760-6863-43e8-8184-CC22FB4CB62C;
PeerServiceId=urn:upnp-org:serviceId:ConnectionManager; Peer ConnectionID=25;
UDN=uuid:B7DA4840-C028-4259-A56D-59551C79BF30;
ServiceID=urn:upnp-org:serviceId:ConnectionManager;
ConnectionID=3

This example includes the entire request header. The part of "X-AV-ConnectionInfo:" to "ConnectionID=25 is expressed as one line. In this example, virtual connection information associated with a real connection establishment request is stored in an X-AV-ConnectionInfo field. The X-AV-ConnectionInfo field is constituted by six parts sectioned by semicolons (;). In the four parts, i.e., PeerUDN, PeerServiceId, PeerConnectionID, and ConnectionID, values corresponding to PeerManager, PeerServiceID, PeerConnectionID, and ConnectionID of the virtual connection information managed by the media renderer MR and allocated in step S14 are buried. In the two remaining parts, i.e., UDN and ServiceId, the UDN of the media renderer MR holding the virtual connection information and the ServiceId of the Connection Manager service are buried. The uniqueness of the virtual connection information expressed by the four former parts is assured. Since the X-A V-connectionInfo field is a field that is not included in the standard specifications and that is defined by a user, an HTTP server that does not adapt to the present invention performs the processes in a way that the field is neglected. At this time, the HTTP server is not obstructed in any way.

Returning to FIG. 7, the real connection management unit 32 in the media renderer MR which transmits an establishment request of a real connection waits for a response from the real connection management unit 22 in the media server MS (step B5). When the real connection management unit 32 is informed from the real connection management unit 22 that the real connection information is registered, i.e., when a real connection is established between the real connection management units 22 and 32, the connection map is updated (step B6). That is, the status field on the channel is made active. Thereafter, the real connection management unit 32 in the media renderer MR receives content data from the real connection management unit 22 in the media server MS according to HTTP and reproduces the received content data.

When a channel is not obtained in step S2 (NO in step B2), the media renderer MR returns an error to the control point CP (step B7).

Figure 8:
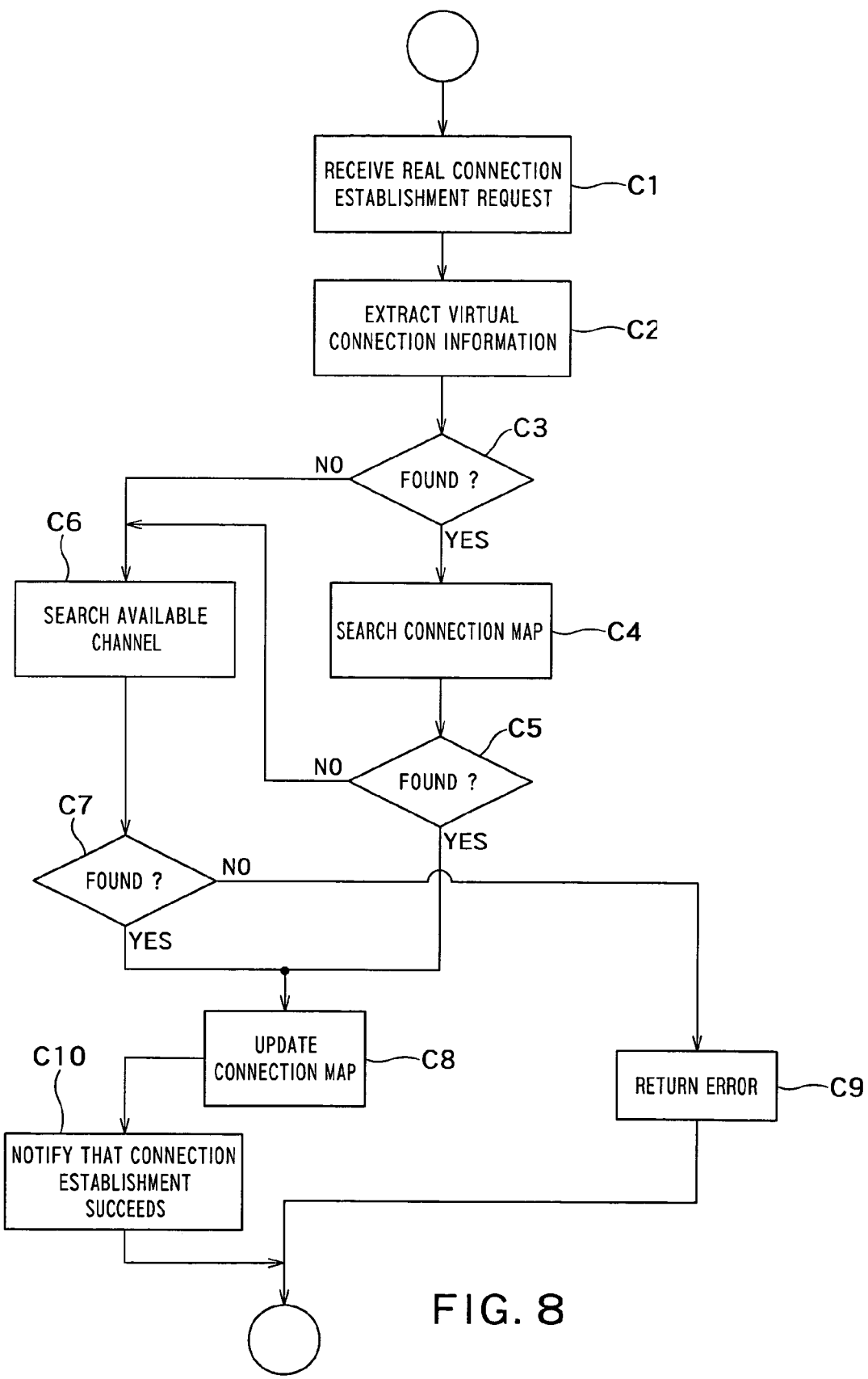
FIG. 8 is a flow chart showing a flow of a real connection establishing process on a media server MS side.

FIG. 8 is a flow chart showing a flow of a real connection establishing process (step S18 in FIG. 3) on the media server MS side.

The real connection management unit 22 in the media server MS which receives an establishment request of the real connection in step B4 in FIG. 7 (step C1) extracts virtual connection information from the received establishment request (step C2).

The real connection management unit 22 searches the connection map 24 for a channel corresponding to the extracted virtual connection information (YES in step C3, step C4). For example, the real connection management unit 22 searches the connection map 24 for a channel including the same value as that of the connection ID of the media server MS included in the virtual connection information.

In this case, a ConnectionID (in X-AV-ConnectionInfo) allocated in the media renderer MR and included in the virtual connection information extracted in step C3 is "3". This is different from ConnectionID (=PeerConnectionID)="−1" on the media renderer MR side recognized by the media server MS. This difference is based on a difference between the contents of arguments when PFC( ) actions of the media server MS and the media renderer MR are called by the control point CP. In the media server MS, this difference can be neglected.

When the corresponding channel is absent (NO in step C5) or when the establishment request of the real connection does not include the virtual connection information (NO in step C3), an available channel is searched for (steps C6 and C7).

When the channel can be acquired in step C5 or C7 (YES in step C5, and YES in step C7), the real connection management unit 22 updates the real connection information in the acquired channel (step C8). That is, a value which identifies a real connection is set in the handle field, the status field is made active, and an appropriate initial value is set in a Last closed time field. Here, it is assumed that the virtual connection information is included in step C3, and it is assumed that information shown in FIG. 14 is registered as real connection information.

When the virtual connection information is not included in step C3 (NO in step C3), the flow proceeds to step C6, and the real connection information is registered without being related to the virtual connection information. That is, it is determined that the establishment request of the real connection is not based on the reserved virtual connection. The connection map is updated without being related to a specific virtual connection. In this manner, connection compatibility with the other party device operated on the basis of a conventional method can be kept. A real connection that is not related to the specific virtual connection may be handled such that the priority of maintenance of the real connection after the establishment is decreased (see steps A8 and A9 in FIG. 6).

The real connection management unit 22 in which the real connection information is registered responds to the real connection management unit 32 in the media renderer MR to notify the real connection management unit 32 that the real connection is established between the real connection management unit 22 and the real connection management unit 32 in the media renderer MR (step C10).

When the real connection management unit 22 notifies the media renderer MR that the real connection is established, the real connection management unit 22 buries the virtual connection information on the media server side into an HTTP GET response header field by the following manner. This example includes an entire response header. A part of "X-AV-ConnectionInfo:" to "ConnectionID=25" is expressed by one line.
HTTP/1.1 200 OK
Date: MON, 29 Mar. 2004 05:37:17 GMT
Server: Apache/1.3.29 (Unix)
Last-Modified: Thu, 25 Jul. 2002 06:51:36 GMT
Etag: "7e0aa2-bf8-3d3f9ff8"

Accept-Ranges: bytes
Content-Length: 3064000
Connection: close
Content-Type: video/mpeg
X-AV-ConnectionInfo:
PeerUDN=uuid:B7DA4840-C028-4259-A56D-59551C79BF30;
PeerServiceId=urn:upnp-org:serviceId: ConnectionManager;
PeerConnectionID=−1;
UDN=uuid:E6CAB760-6863-43e8-8184-CC22FB4CB62C;
ServiceId=urn:upnp-org:serviceId: ConnectionManager;
ConnectionID=25

The contents are basically the same as the information buried into the GET request in step B4. However, the contents are different from the information buried into the GET request in that the contents have a viewpoint from the HTTP server, i.e., the media server MS side. An HTTP client, i.e., the media renderer MR, by receiving the virtual connection information, can recognize that the virtual connection and the real connection are associated in the other party device.

ConnectionID (PeerConnectionID in X-AV-ConnectionInfo) on the media renderer MR side recognized by the media server MS is "−1", and is different from ConnectionID="3" allocated in the media renderer MR. This difference is based on a difference of the contents of arguments used when PFC( ) actions of the media server MS and the media renderer MR are called by the control point CR The difference can be neglected in the media renderer MR.

When the response from the media server MS are results of the processes performed through YES in step C7, the real connection information in the media server MS is not appropriately related to the virtual connection information. As a result, information stored in X-AV-ConnectionInfo may be imperfect, or an X-AV-ConnectionInfo field may be absent. In this case, the media renderer MR can recognize that, although a real connection could be established, the real connection could not be related to the virtual connection in the media server MS.

In the above series of procedures, information which can be used to recognize the uniqueness of the virtual connection may be limited to only the ConnectionID allocated in the media server MS, to which significant information is assigned. The ConnectionID is recognized by both the media server MS and the media renderer MR, as the value is matched in the devices.

In such a case, virtual connection information, such as information managed by the media server MS and the media renderer MR and associated with the real connection and such as information stored in X-AV-ConnectionInfo in steps B4 and C10, is defined as a set of ConnectionID recognized to be allocated in the media server MS.

Further, another virtual connection information may be constituted by arbitrary pieces of information or a combination of the pieces of information.

Returning to FIG. 8, when a channel cannot be obtained in step C7 (NO in step C7), the real connection management unit 22 makes a response to the real connection management unit 32 in the media renderer MR to notify the real connection management unit 32 that establishment of a real connection fails (step C9).

Returning to FIG. 3, the control point CP orders the virtual connection management units 23 and 33 in the media server MS and the media renderer MR to execute ConnectionComplete( ) actions depending on, e.g., a instruction by a user (steps S19 and S20). At this time, the respective virtual connection information is specified to the virtual connection management units 23 and 33. In this manner, virtual connection corresponding to the specified virtual connection information and real connection related to the virtual connection are released (connection releasing process).

Figure 9:
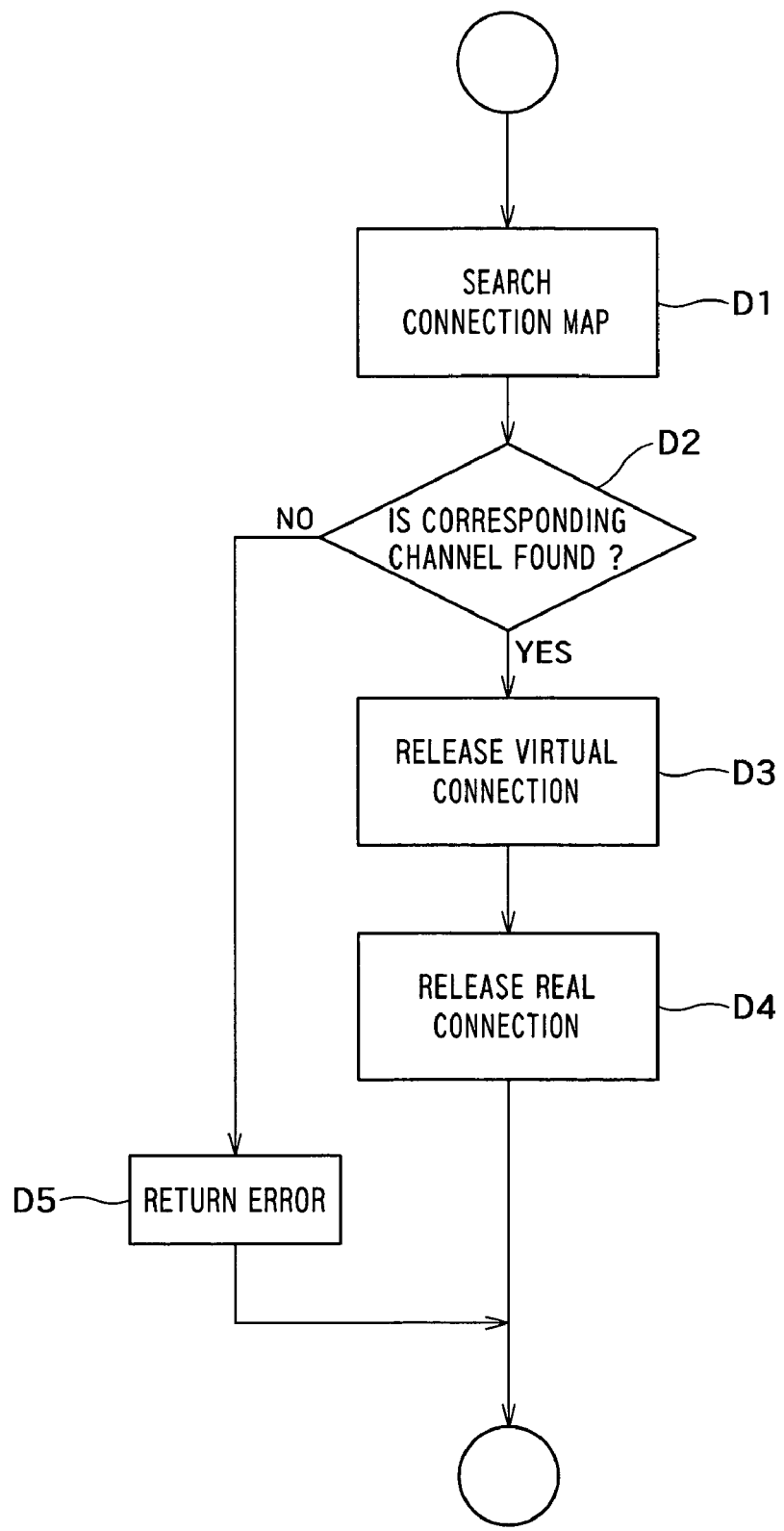
FIG. 9 is a flow chart for explaining a flow of a first connection releasing process.

FIG. 9 is a flow chart for explaining a flow of a connection releasing process (first connection releasing process). The following processes are performed in the media server MS and the media renderer MR, respectively.

A channel including the virtual connection information specified by the control point CP is searched for on the connection map (step D1).

When the channel is found (YES in step D2), the virtual connection information is erased from the channel (virtual connection is released) (step D3).

Real connection information corresponding to the erased virtual connection information is erased from the channel (for example, at least handle is made null, and status is made inactive) (real connection is released) (step D4). In a case of execution of data transmission, the real connection information is erased after the data transmission is stopped. In this manner, the channel is released.

When a channel is not found in step D2 (NO in step D2), an error is returned to the control point CP (step D5).

In the first connection releasing process described above, the control point CP causes the media server MS and the media renderer MR to execute ConnectionComplete( ) actions to explicitly release the connection, that is to say, the connection is released by a instruction by a user. Automatic releasing of the connection will be described below.

Figure 10:
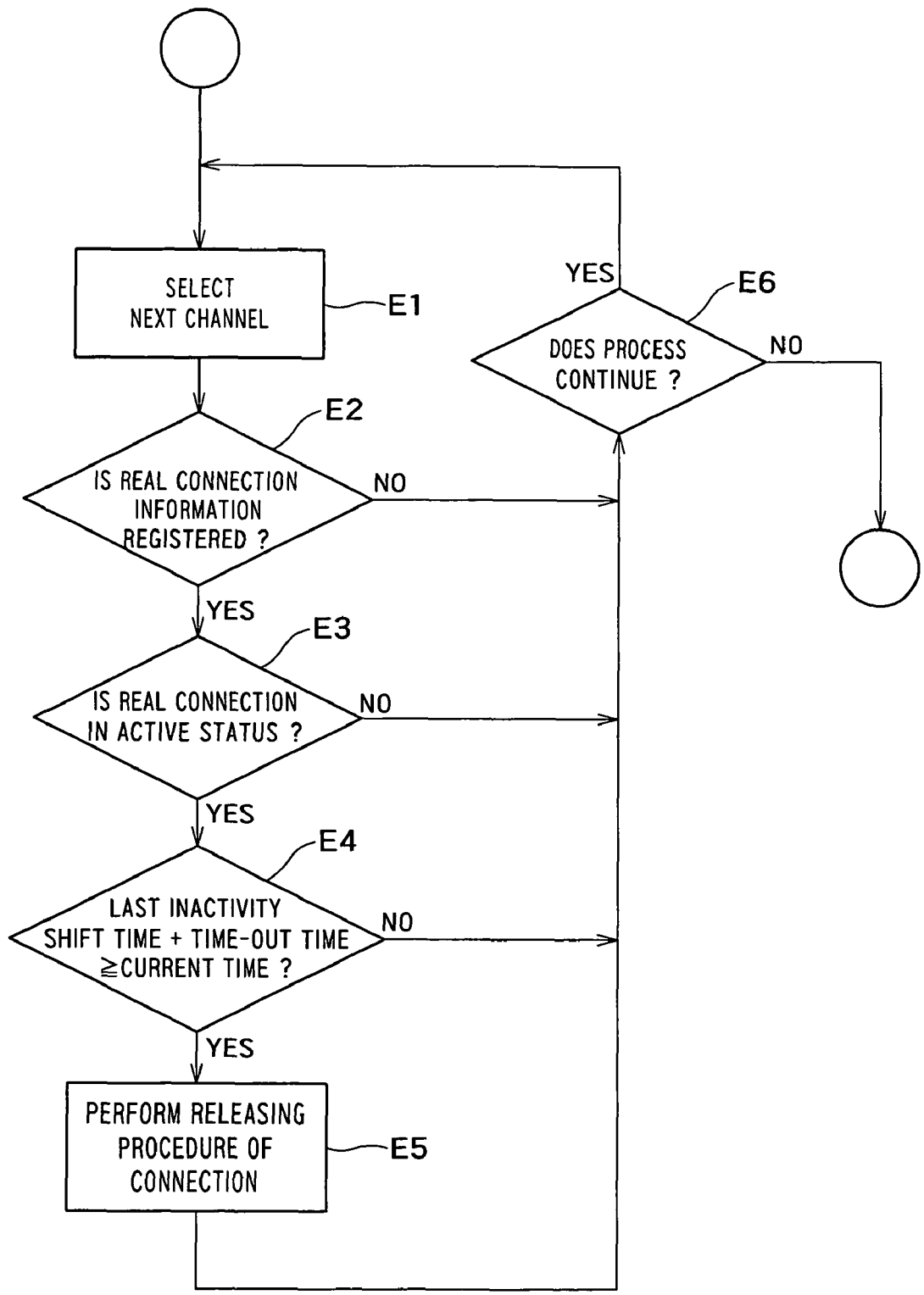
FIG. 10 is a flow chart for explaining a flow of a second connection releasing process.

FIG. 10 is a flow chart for explaining a flow of an automatic releasing process (second connection releasing process) of the connection.

The virtual connection management units 23 and 33 in the media server MS and the media renderer MR select one channel (step E1) to determine whether real connection information is registered (step E2).

When the real connection information is registered (YES in step E2), whether the real connection is active or inactive is judged (step E3).

When the real connection is inactive (YES in step E3), "last inactivity shift time+time-out time−current time" is calculated on the basis of last inactivity shift time included in the real connection information (step E4). The time-out time is a predetermined value. The virtual connection continues for the time represented by the time-out time even though the real connection is inactive. This is effective in a transmission protocol that repeats establishment and disconnection of the connection in a reproducing process.

When the calculated value is 0 or more (YES in step E4), i.e., when the time-out time has elapsed after the last inactivity shift time, the connection releasing process is performed according to the flow chart shown in FIG. 9 (step E5).

When the real connection information is not registered in step E2 (NO in step E2), when the real connection is active in step E3 (NO in step E3), and when the value calculated as described above is smaller than 0 NO in step E4), if the process is continued (YES in step E6), the next channel is selected (step E1) to perform the same processes as described above.

Figure 11:
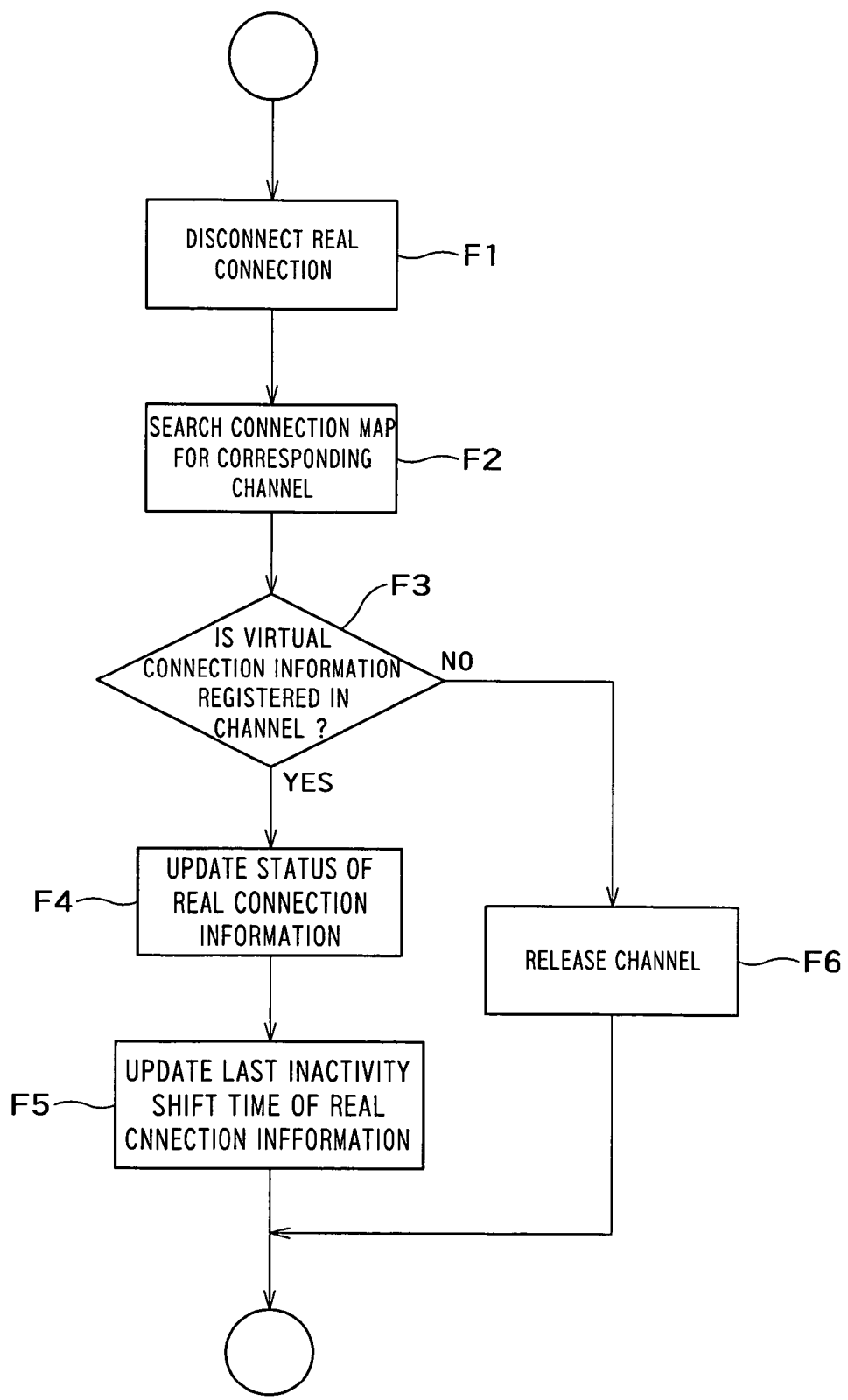
FIG. 11 is a flow chart for explaining an updating process of last inactivity shift time.

FIG. 11 is a flow chart for explaining an updating process of the last inactivity shift time.

The real connection management units 22, 32 in the media server MS and the media renderer MR search the connection map for a channel corresponding the real connection (step F2) when the status of the real connection shifts to an inactive status (step F1).

When the virtual connection information is not registered in the found channel (NO in step F3), the real connection information is erased by the same manner as that in step D4 in FIG. 9 to release the channel (step F6).

On the other hand, when the virtual connection information is registered in the found channel (YES in step F3), the status field in the real connection information is made active (step F4), and the last inactivity shift time in the Last closed time field is updated (step F5).

Figure 12:
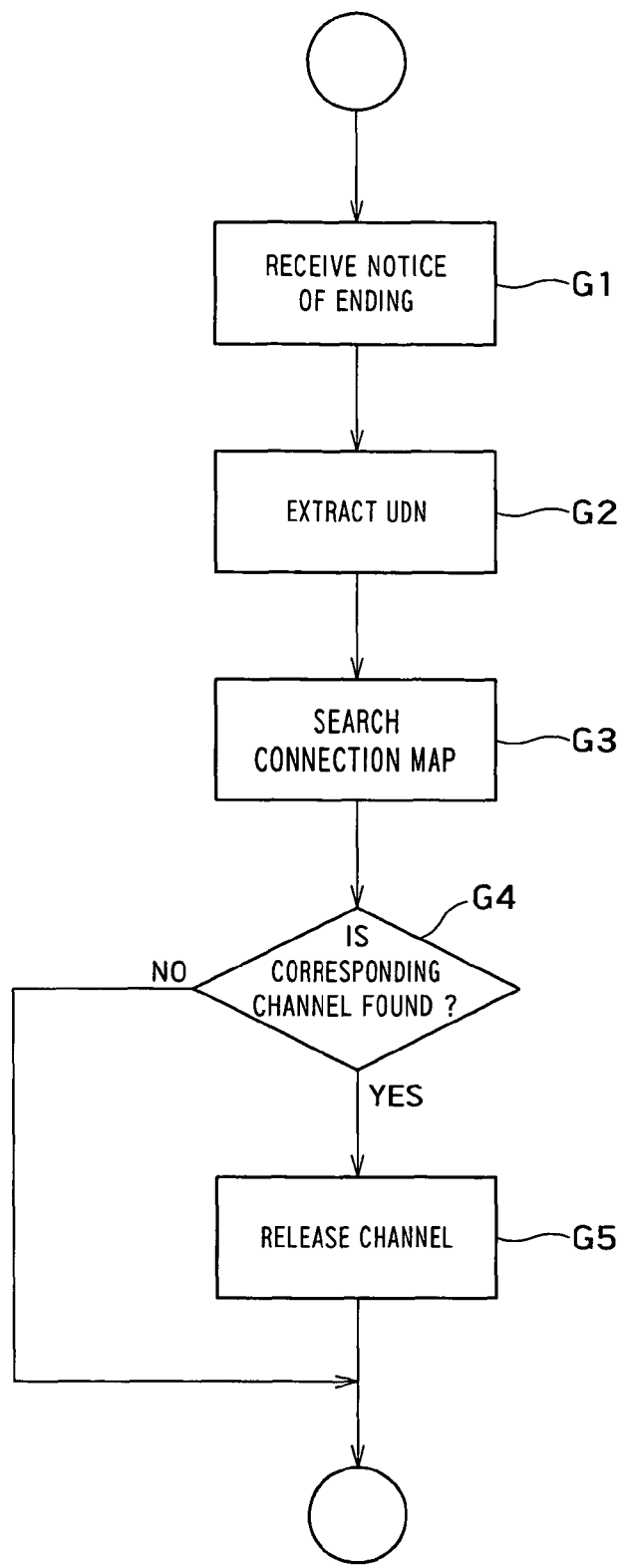
FIG. 12 is a flow chart for explaining a flow of a third connection releasing process.
Figure 13:
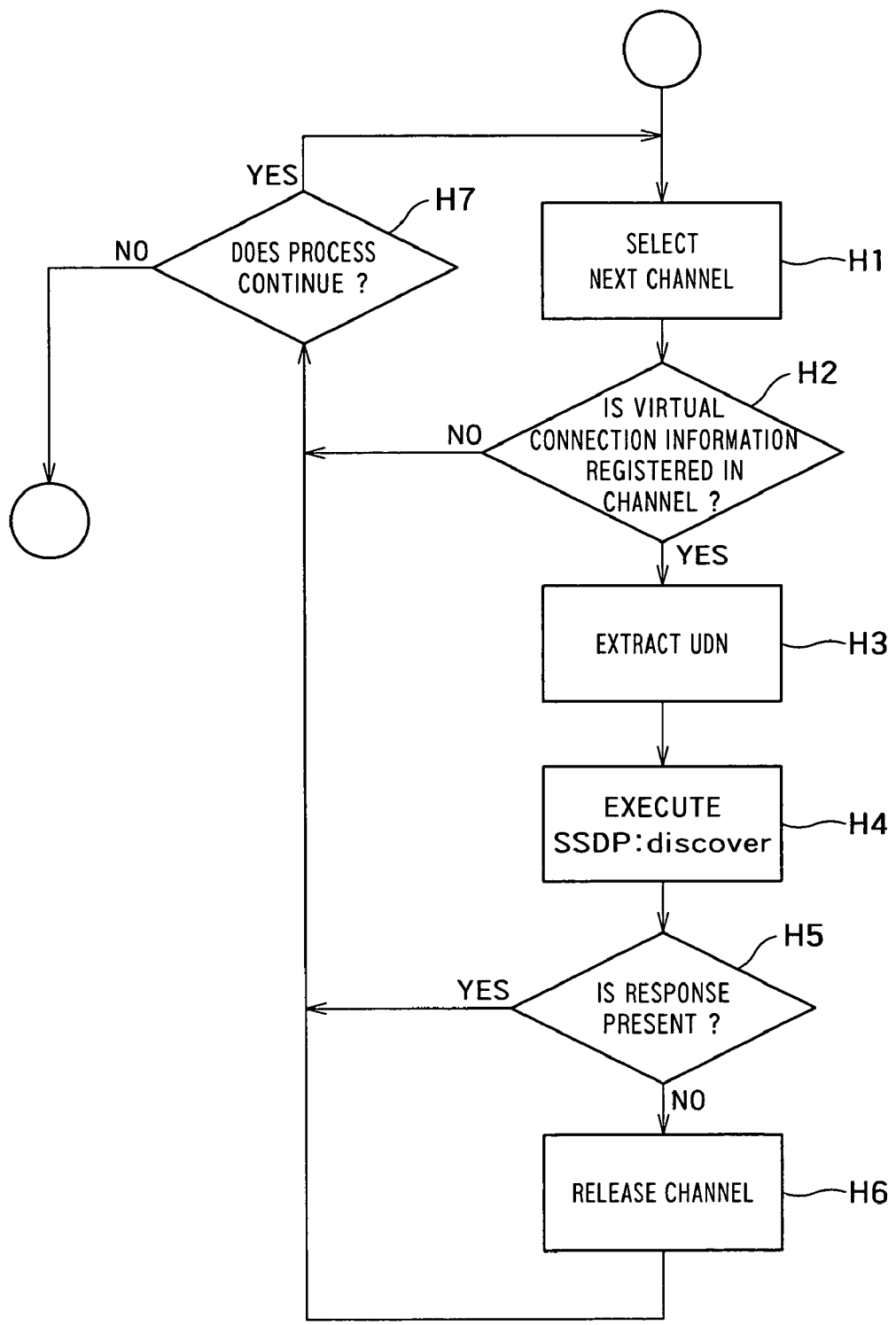
FIG. 13 is a flow chart for explaining a flow of a fourth connection releasing process.

In this case, although the connection releasing process can also be performed according to the first and second connection releasing processes (see FIGS. 9 and 10), the connection releasing process can be performed in a manner shown in the flow charts in FIGS. 12 and 13 by adding the functions of UPnP control points to the media server MS and the media renderer MR.

FIG. 12 is a flow chart for explaining a flow of a third connection releasing process.

The media server MS or the media renderer MR receives a notice of ending (for example SSDP: byebye) from the media renderer MR, the media server MS or a peripheral UPnP device (media server or media renderer) (step G1). The notice of ending includes an UDN or the like of the device.

The UDN included in the notice of ending is extracted to search the connection map to check whether a channel having the extracted UDN is present (steps G2 and G3).

When the channel is found (YES in step G4), the channel is released according to the flow chart in FIG. 9 (step G5). When the channel is not found (NO in step G4), any special process is not performed.

FIG. 13 is a flow chart for explaining a flow of a fourth connection releasing process.

The media server MS or the media renderer MR selects a channel from the connection map (step H1). When virtual connection information is registered in the selected channel (YES in step H2), SSDP: discover (searching procedure for UPnP) is executed for an UDN in the virtual channel information (steps H3 and H4).

When a response cannot be obtained from a device having the UDN (NO in step H5), it is determined that the device is not connected to the network, and the channel is released (step H6).

When the virtual connection information is not registered in step H2 (NO in step H2), when a response is obtained in step H5 (YES in step H5), and when the process is continued after step H6 (YES in step H7), the next channel is selected (step H11).

In this manner, when an action of other device is ended or is not recognized by the procedures shown in FIGS. 12 and 13, a channel allocated to the other device can be released.

In the embodiment described above, pull-type stream transmission in which a real connection is established from a media reproducing side such as an HTTP-GET to a media supply side to request data transmission is performed. However, the present invention can also be applied to push-type stream transmission. In this case, on a media server side serving as a media sending side, as in the conventional method, a real connection is related to a virtual connection in establishment of the real connection. In a media renderer on the media reproducing side, a virtual connection can be related to an actual resource according to the present invention.

The present invention can be applied to a protocol in which virtual connection information is buried in establishment of a real connection and the buried virtual connection information can be extracted. For example, when RTSP/RTP/UDP is used, a user-defined header can be added to the RTSP. Therefore, when the virtual connection information is buried in the RTSP, the present invention can be applied.

The embodiment is considered to be similar to a cookie or a session ID used in a Web application. However, as one of the differences therebetween, for example, session information is exchanged between only a server and a client in a normal Web application. In contrast to this, in the embodiment, a control point may transfer session information between a server and a client.

In the above description, all or some functions of the elements shown in FIG. 1 may be realized as hardware, may be realized by causing a computer to execute a program generated by a normal programming technique, or may be realized by both of the above means.

As described above, according to the embodiment, virtual connection information is transmitted to the other party device in an establishing process of a real connection. For this reason, even though the real connection is formed after a virtual connection is formed, the real connection and the virtual connection can be related to each other. Therefore, the real connection can be properly controlled through the virtual connection.

According to the embodiment, on the basis of an identifier (UDN) of other party device extracted from virtual connection information, an action status of the other party device is recognized. When it is determined that the other party device is in an inactive status, the channel is released. Therefore, channel management can be properly performed.

According to the embodiment, for a predetermined period of time or longer from the last inactivity shift time of the real connection, the channel is released. Therefore, the channel management can be appropriately performed.

According to the embodiment, when virtual connection information is not included in an establishment request of the real connection, a channel registered in establishment of the virtual connection is not to be allocated to the establishment request (see NO in steps C6 and C7). Data transmission based on a UPnP AV protocol is more properly performed.

What is claimed is:

1. A data transmission system including first and second media devices that communicate with each other according to a predetermined transmission protocol and a control device that controls the first and second media devices according to a UPnP AV protocol different from the predetermined transmission protocol, the UPnP AV protocol used in generating and managing of a virtual connection and the predetermined transmission protocol used in generating and managing of a real connection, the two protocols being defined independently of each other, the control device comprising:
a virtual connection establisher which establishes a virtual connection in accordance with the UPnP AV protocol between the first and second media devices; and
a communication controller which transmits instruction data to the first media device for instructing the first media device to receive media data from the second media device or transmit media data to the second media device by using the virtual connection, the instruction data including information of the virtual connection established by the virtual connection establisher;

the first media device comprising:
a real connection establishment requester which generates a real connection establishment request for requesting the second media device to establish a real connection for receiving or transmitting the media data in accordance with the predetermined transmission protocol in a case of receiving the instruction data, and which transmits the real connection establishment request to the second media device in accordance with the predetermined transmission protocol, the real connection establishment request including information of the virtual connection established by the establisher; and a first communicator which receives the media data from the second media device or transmits the media data to the second media device by using the established real connection; and the second media device comprising:

a real connection establisher which establishes the real connection with the first media device on a basis of the real connection establishment request from the first media device in accordance with the predetermined transmission protocol when the information of the virtual connection included in the real connection establishment request indicates the virtual connection established by the virtual connection establisher, the established real connection being related to the virtual connection established by the virtual connection establisher; and a second communicator which transmits the media data to the first media device or receives the media data from the first media device by using the established real connection.

2. The data transmission system according to claim 1, wherein the virtual connection establisher in the control device has:

a first instructor which transmits a first instruction of instructing generation of virtual connection information in the second media device side, to the second media device; and a second instructor which, in a case where the virtual connection information in the second media device side is received from the second media device, transmits a second instruction of instructing generation of virtual connection information in the first media device side to the first media device, the second instruction including the virtual connection information in the second media device side;

the second media device further comprises:

a first allocator which, in a case where the first instruction is received, generates the virtual connection information in the second media device side, and which allocates the generated virtual connection information in the second media device side to one of communication resources in the second media device side; and an information transmitter which transmits the generated virtual connection information in the second media device side to the control device;

the first media device further comprises:

a second allocator which, in a case where the second instruction is received, generates the virtual connection information in the first media device side, allocates the generated virtual connection information in the first media side to one of communication resources in the first media side; and a third allocator which generates real connection information in the first media device side in the case where the instruction data is received from the control device, and which allocates the generated real connection information in the first media device side to said one communication resource in the first media device side; and the real connection establisher in the second media device generates real connection information in the second media device side in the case where the real connection establishment request is received from the first media device, allocates the generated real connection information in the second media device side to said one communication resource in the second media device side, the virtual connection information in the second media device side being included in the real connection establishment request from the first media device as the information of the virtual connection.

3. A data transmission method that uses first and second media devices which communicate with each other according to a predetermined transmission protocol and a control device which controls the first and second media devices based on a UPnP AV protocol different from the predetermined transmission protocol the UPnP AV protocol used in generating and managing of a virtual connection and the predetermined transmission protocol used in generating and managing of a real connection, the two protocols being defined independently of each other, the data transmission method comprising:

establishing a virtual connection between the first and second media devices under control of the control device;

generating a real connection establishment request based on the predetermined transmission protocol in the first media device, the real connection establishment request including information of the virtual connection established by said establishing;

transmitting the real connection establishment request from the first media device to the second media device;

establishing a real connection between the first and second media devices when the information of virtual connection included in the real connection establishment received by the second media device indicates the virtual connection established by said establishing, the established real connection being related to the virtual connection established by said establishing; and transmitting media data from the second media device to the first media device or versa by using the established real connection.

4. The data transmission method according to claim 3, wherein the establishing the virtual connection includes:

generating virtual connection information in the second media device side to allocate the generated virtual connection information in the second media device to one of communication resources in the second media device side;

transmitting the virtual connection information in the second media device side to the first media device via the control device; and generating virtual connection information in the first media device side on a basis of the virtual connection information in the second media device side and allocating the virtual connection information in the first media device side to one of communication resources in the first media device side;

the transmitting the real connection establishment request includes:

transmitting the real connection establishment request having the virtual connection information in the second media device side as the information of the virtual connection, to the second media device; and the establishing the real connection includes:

generating real connection information in the first media device side and allocating the real connection information in the first media device side to said one communication resource in the first media device side; and generating real connection information in the second media device side and allocating real connection information in the second media device side to said one communication resource in the second media device side.

5. A media device which communicates with a further media device according to a predetermined transmission protocol and which is controlled by a control device in accordance with a UPnP AV protocol different from the predetermined transmission protocol, the UPnP AV protocol used in generating and managing of a virtual connection and the predetermined transmission protocol used in generating and managing of a real connection, the two protocols being defined independently of each other, the media device comprising:
 a virtual connection establisher which establishes a virtual connection with the further media device in a case of receiving instruct of instructing to establish the virtual connection from the control device;
 a request generator which, in a case of receiving instruction data which includes information of the established virtual connection and instructs to receive media data from the further media device or transmit media data to the further media device by using the virtual connection from the control device, generates a request for requesting the further media device to establish a real connection for receiving or transmitting the media data in accordance with the predetermined transmission protocol, the request including information of the established virtual connection;
 a request transmitter which transmits the generated request including the information of the established virtual connection to the further media device to establish the real connection with the further media device in accordance with the predetermined transmission protocol; and
 a data communicator which receives the media data from the further media device or transmits the media data to the further media device by using the established real connection.

6. The media device according to claim 5, wherein
 the virtual connection establisher receives virtual connection information in the further media device side via the control device, generates virtual connection information in the media device side on a basis of the virtual connection information in the further media device side, and allocates the generated virtual connection information in the media device side to one of communication resources in the media device side; and
 the request generator generates real connection information in the media device side in the above case of being instructed to receive or transmit the media data, allocates the generated real connection information in the media device side to said one communication resource in the media device side, and generates the request including the virtual connection information in the further media device side as information of the virtual real connection.

7. A media device which communicates with a further media device according to a predetermined transmission protocol and which is controlled by a control device in accordance with a UPnP AV protocol different from the predetermined transmission protocol, the UPnP AV protocol used in generating and managing of a virtual connection and the predetermined transmission protocol used in generating and managing of a real connection, the two protocols being defined independently of each other, the media device, comprising:
 a virtual connection establisher which establishes a virtual connection with the further media device in accordance with the UPnP AV protocol in a case of receiving instruct of instructing to establish the virtual connection from the control device, and which transmits information of the established virtual connection to the control device;
 a request receiver which receives an establishment request of a real connection for transmitting media data to the further media device or receiving media data from the further media device, from the further media device;
 a real connection establisher which, in a case where the information of the established virtual connection is included in the establishment request, establishes the real connection related to the virtual connection in accordance with the predetermined transmission protocol, the real connection being related to the established virtual connection; and
 a data communicator which transmits the media data to the further media device or receives the media data from the further media device, by using the real connection.

8. The media device according to claim 7, wherein
 the virtual connection establisher generates the virtual connection information in a case of receiving the instruct, allocates the generated virtual connection information to one of communication resources, and transmits the virtual connection information to the control device; and
 the real connection establisher generates real connection information in a case where the virtual connection information is included in the establishment request of the real connection from the further media device, allocates the generated real connection information to said one communication resource.

* * * * *